United States Patent [19]

Kondo et al.

[11] Patent Number: 5,063,541
[45] Date of Patent: Nov. 5, 1991

[54] BEAM FORMING METHOD AND APPARATUS THEREFOR IN ULTRASONIC IMAGING SYSTEM

[75] Inventors: Shin-ichi Kondo, Kodaira; Kageyoshi Katakura, Tokyo; Hiroshi Ikeda, Hachioji, all of Japan

[73] Assignee: Hitachi Medical Corp., Tokyo, Japan

[21] Appl. No.: 500,907

[22] Filed: Mar. 29, 1990

[30] Foreign Application Priority Data

Mar. 31, 1989 [JP] Japan ................................. 1-082336

[51] Int. Cl.5 ............................................. G03B 42/06
[52] U.S. Cl. ........................................ 367/7; 367/901; 367/105; 73/626
[58] Field of Search ...................... 367/7, 11, 105, 901, 367/903; 364/574; 358/112; 128/661.01; 73/626, 613; 381/94; 342/158, 190, 371, 374

[56] References Cited

U.S. PATENT DOCUMENTS 4,218,768 8/1980 Hassler ................................. 367/105
4,392,379 7/1983 Yamaguchi .......................... 367/105

FOREIGN PATENT DOCUMENTS

61-76142 4/1986 Japan .

Primary Examiner—Daniel T. Pihulic
Attorney, Agent, or Firm—Antonelli, Terry Stout & Kraus

[57] ABSTRACT

A beam former method and an apparatus therefor in an ultrasonic imaging system, in which switching of delay elements is performed by means of delay switches in a section in which no ultrasonic wave transmission/reception is performed and switching noise generated in this section is stored as a noise signal into a memory. The stored noise signal is subtracted from a reception signal which is obtained through ultrasonic wave transmission/reception and which contains switching noise superimposed thereon to thereby obtain a reception signal from which the noise has been eliminated.

28 Claims, 7 Drawing Sheets

BEAM FORMING METHOD AND APPARATUS THEREFOR IN ULTRASONIC IMAGING SYSTEM

BACKGROUND OF THE INVENTION

The present invention relates to a beam forming method from receiving signals of ultrasonic waves and an apparatus therefore in an ultrasonic imaging system, in particular, in an electronic scanning type ultrasonic imaging system.

As a receiving beam former circuit in a conventional ultrasonic imaging system, for example, a beam former circuit using delay means which performs its delaying operation by sampling is known as disclosed in Japanese Patent Unexamined Publication No. 61-76142.

In the above-mentioned related technique, there has been a problem of reduction in S/N due to occurrence of delay switching noise or due to occurrence of periodic noise. The delay switching noise is a kind of switching noise due to dynamic focusing in which the quantity of delay of a reception echo signal is switched by changing a focal position. On the other hand, the periodic noise (which becomes a "fixed pattern" noise in displayed picture) is generated in so-called parallel sampling in which the respective sampling timings of a plurality of parallelly-connected switched capacitors are shifted relative to each other to thereby make the sampling frequency high.

SUMMARY OF THE INVENTION

It is therefore an object of the present invention to solve the problem in the conventional technique as described above.

It is another object of the present invention to provide a beam forming method and an apparatus therefor, in which the influence of the above-mentioned delay switching noise and periodic noise onto a reception signal is eliminated to thereby make it possible to perform receiving beam former with good S/N.

In order to attain the above objects, according to the present invention, a reception echo signal is processed through the following steps:

(a) A section in which ultrasonic transmission/reception is not carried out is provided, so that a delay switch for dynamic focus and a sampling element parallel to the switch are actuated to operate in the above-mentioned section and the switching noise and periodic noise as offset differences generated in this section are stored in a memory device;

(b) In another section in which ultrasonic transmission/reception is carried out to perform actual measurement, the noise signal stored in the memory device in the step (a) is read out of the memory device and the read-out noise signal is subtracted in a differential amplifier from a reception signal having switching noise and periodic noise superimposed thereon to thereby obtain the reception signal in which the noise has been eliminated; and (c) The signal which is obtained in the step (b) and in which the noise has been eliminated is processed in a time gain constant (TGC) circuit and a compression and detection circuit provided in the next stages.

DESCRIPTION OF THE PREFERRED EMBODIMENTS

Figure 1:
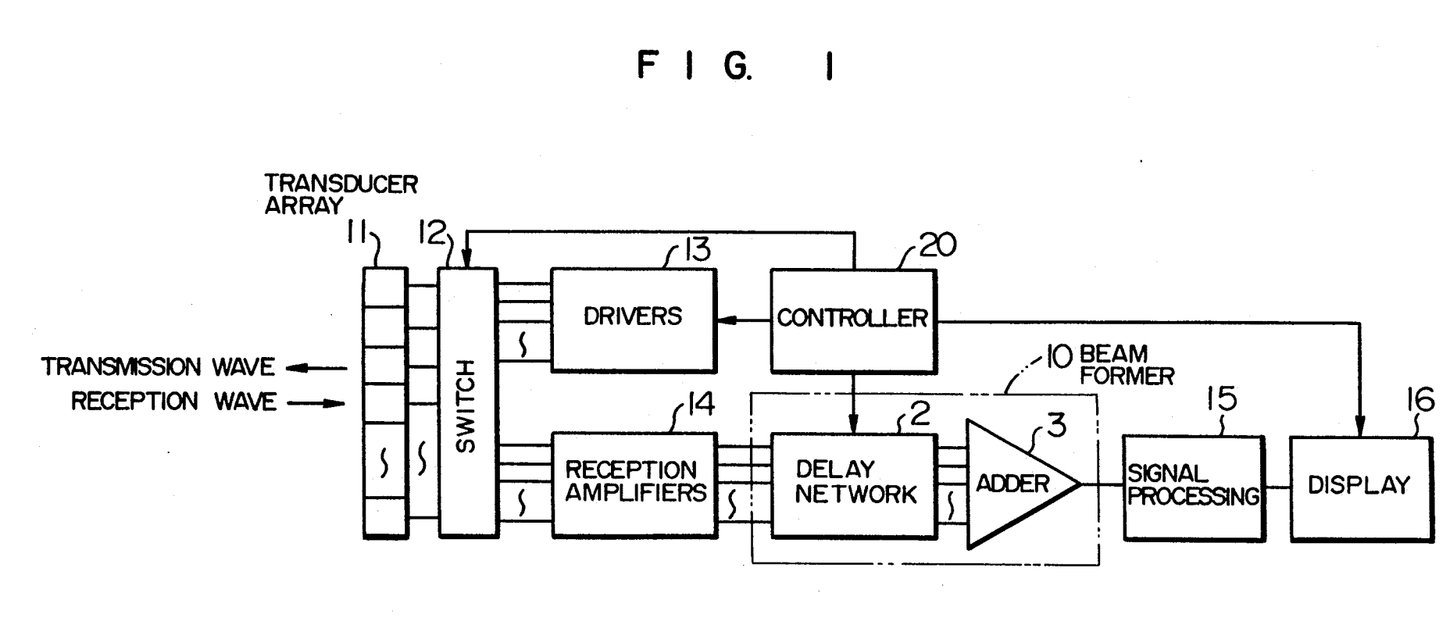
FIG. 1 is a block diagram showing the ultrasonic imaging system using a beam former circuit according to the present invention.

FIG. 1 is a block diagram showing the configuration of an embodiment of the ultrasonic imaging system using a receiving beam former circuit according to the present invention. First, the whole configuration will be described. In FIG. 1, the configuration is constituted by: a receiving beam former 10 including a delay network 2 and an adder 3; a transducer array 11 for transmitting/receiving an ultrasonic wave; a switching device 12 for performing linear or convex electronic scanning; drivers 13 for generating a digital delay signal to perform ultrasonic wave transmission control; a receiving amplifier 14 for amplifying a reception ultrasonic wave; a signal processing portion 15; a display portion 16; and a control portion 20 for controlling the whole circuit including the beam former 10.

The operation of the ultrasonic imaging system of this embodiment is as follows. That is, when the wave transmitting portion 13 supplies a transmission signal to the switching device 12, the switching device 12 selects necessary ones of elements of the transducer array 11 so that the transducer array 11 transmits the transmission signal through only the elements of the transducer array 11 selected by the switching device 12 to thereby form a desired a transmission-wave beam. Reflection waves (reflection echos) from an objective body (not shown) with respect to the transmission-wave beam are received and transformed by the transducer array 11 and only the electrical signals selected by the switching device 12 are amplified by the receiving amplifier 14.

In order to form a desired reception-wave beam in accordance with the focal position and beam direction in the beam former 10 on the basis of an instruction from the control circuit 20, the output of the receiving amplifier 14 is supplied to the beam former 10 and the input signals are delayed in a beam former portion in the beam former 10. After making the input signals be in phase, the input signals are added to each other in an adder in the beam former 10. The output of the adder is subject to the above-mentioned noise elimination processing. After the output of the beam former 10 is subject to signal processing such as TGC, compression, detection, etc., in the signal processing circuit 15, the output of the signal processing circuit 15 is displayed in the display portion 16.

Figure 2:
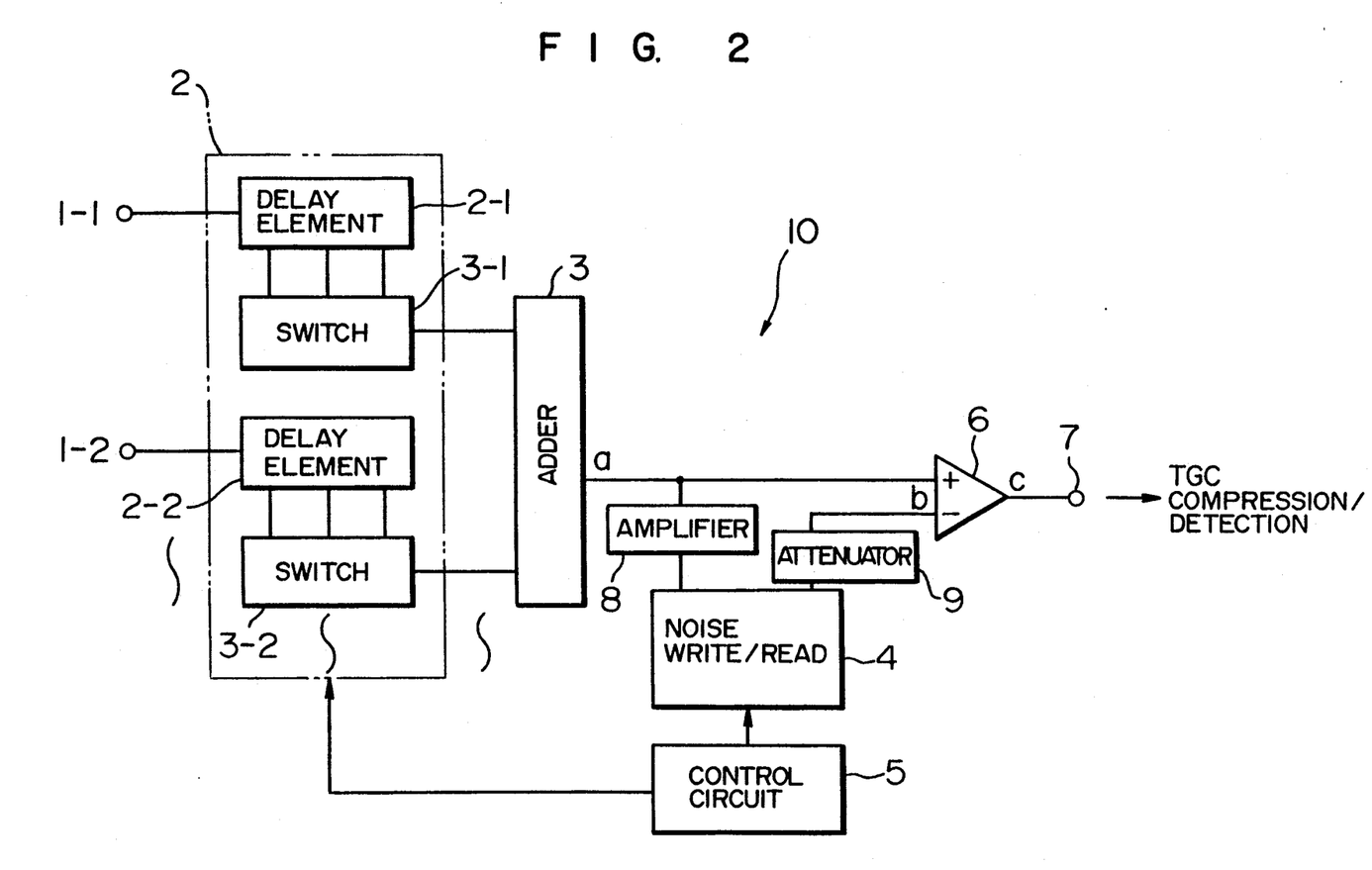
FIG. 2 is a block diagram showing the receiving beam former circuit according to the present invention.

FIG. 2 is a diagram showing an embodiment of the beam former 10 according to the present invention. The beam former 10 includes: input terminals 1-1, 1-2, ... for receiving the reception signals supplied from the respective elements of the transducer array 11 through the receiving amplifier 14; a delay network 2 constituted by delay elements 2-1, 2-2, ..., and switches 3-1, 3-2, ...; an adder 3 for adding the respective outputs of the delay network 2 to each other; a noise write/read device 4 which will be described later; a control circuit 5 for controlling the delaying and switching operation of the delay network 2 and the storing and reading operation of the noise write/read device 4; a differential amplifier 6; a beam former addition output terminal 7; an amplifier 8 for amplifying the noise signal for relatively reducing the influence of the digital noise in the noise write/read device 4; and an attenuator 9 for converting the noise level into original one when the noise signal is read out. The amplifier 8 and the attenuator 9 are provided as occasion demands. An echo wave from a focal point far away from the transducer array 11 reaches the transducer array 11 in a state that the echo wave has a spherical wave surface of a large radius of curvature, and, on the contrary, an echo wave from a focal point nearer to the transducer array 11 reaches the transducer array 11 in a state that the echo wave has a spherical wave surface of a small radius of curvature. Accordingly, the quantities of delay to be set for the respective input signals received by the delay network 2 are different from each other depending on the focal position. Further, the quantity of delay to be set for each input signal received by the delay network 2 varies depending on the way of catching the input signal as to whether the reception wave is caught as an echo beam in the oblique direction or caught as an echo beam in the frontal direction. Accordingly, corresponding to the focal position and beam direction of the ultrasonic wave beam, desired delay is performed on each reception signal by means of the delay elements 2-1, 2-2, . . . and switches 3-1, 3-2, . . . and the thus delayed reception signals are subject to beam former addition by means of the adder 3.

Figure 3:
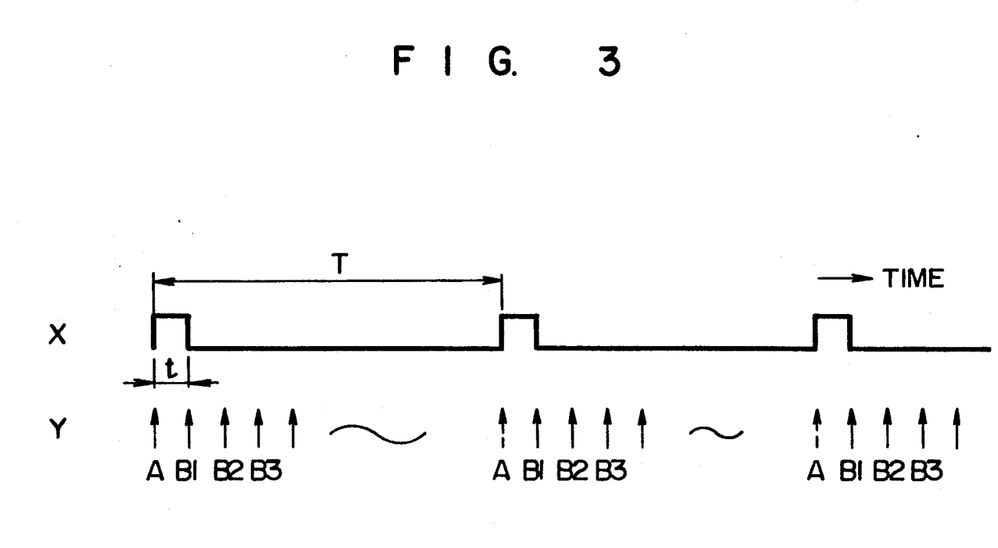
FIGS. 3 and 4 are time charts for explaining the principle of noise elimination.
Figure 4:
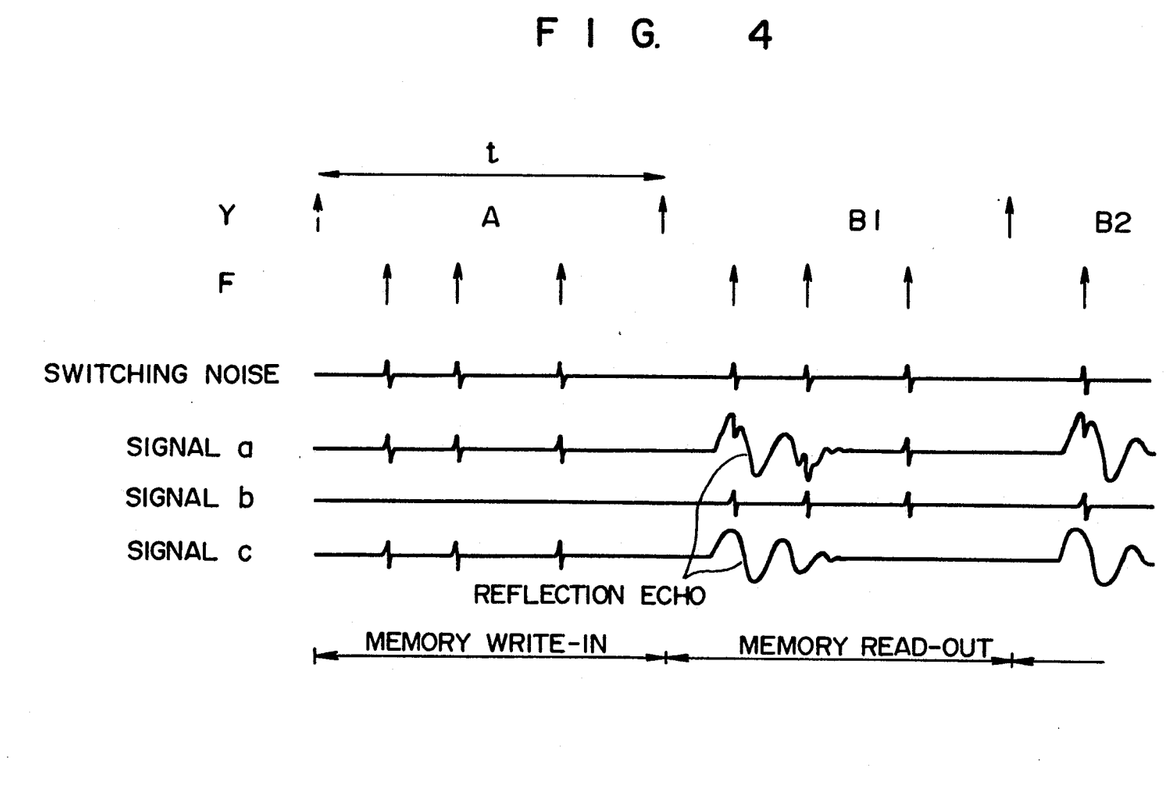

On the other hand, the switches 3-1, 3-2, . . . generate switching noise. Referring to FIGS. 3 and 4, a method how to eliminate such switching noise will be described hereunder.

FIG. 3 is a diagram showing the timing of the frame synchronization X and the wave transmission time Y in the case of formation of a B-mode image in the ultrasonic imaging system according to the present invention. The time interval of the frame synchronization X is represented by "T" and the time interval of the wave transmission time Y is represented by "t". The period where the frame synchronizing signal X is at a "H" level, for example, the section where the wave transmission time signal Y is "A", is established to be a blanking period or an initializing period so that no ultrasonic wave transmission/reception is carried out. The sections where the signal Y is "B1", "B2", . . . are the ultrasonic wave reception sections corresponding to the first, second, . . . ultrasonic wave transmission, respectively.

FIG. 4 is an enlarged timing chart of a part of FIG. 3 for showing the principle of noise elimination according to the present invention. In the drawing, "Y" represents the wave transmission time as described above, the arrow of broken line represents non-transmission of ultrasonic waves, and "F" indicates points of time where the respective quantities of delay at the beam former portion are switched on real time in order to form an echo beam from a desired focal distance.

According to the present invention, noise elimination is performed through the following steps.

Step (a): In the section "A" where no wave transmission/reception is carried out, the same delay switching as in the sections "B1", "B2", . . . is performed to thereby generate switching noise and the switching noise (signal a) at the output of the adder 3 at that time is store in the noise write/read device 4 shown in FIG. 2.

Step (b): In the sections "B1", "B2", . . . , the reception signal a produced at the output of the adder 3 at this time is applied to an input of the differential amplifier 6 and, at the same time, the switching noise signal b previously stored in the noise write/read device 4 is read out therefrom and applied to the other input of the differential amplifier 6 so that a difference between the signals a and b is calculated in the differential amplifier 6 to thereby obtain a signal c in which the switching noise has been eliminated.

On the other hand, in the case where the delay time to be set is different between the sections "B1", "B2", . . . from each other, for example, as in the case of sector electronic scanning, the noise elimination is performed in the manner as follows. That is, in FIG. 3, the first frame section T is established to be an initializing section in which no wave-transmission is carried out and only the delay switching is carried out so that the switching noise generated in this section is stored in the noise write/read device 4, and, thereafter, in the second frame section et seq., a difference between the reception signal and the noise signal is calculated to thereby eliminate the noise like the case of the linear or convex electronic scanning.

Figure 5A:
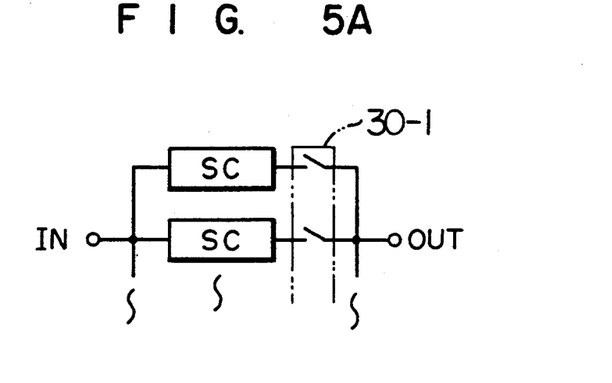
FIGS. 5A, 5B and 5C are block diagrams each showing the configuration of the beam former portion.
Figure 5B:
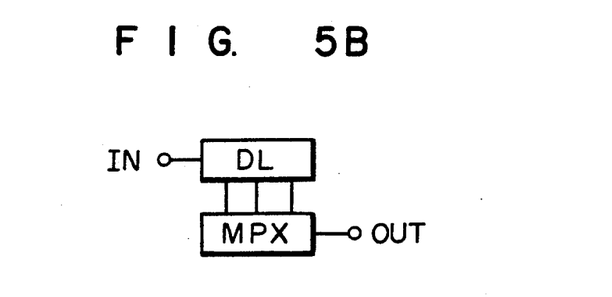
Figure 5C:
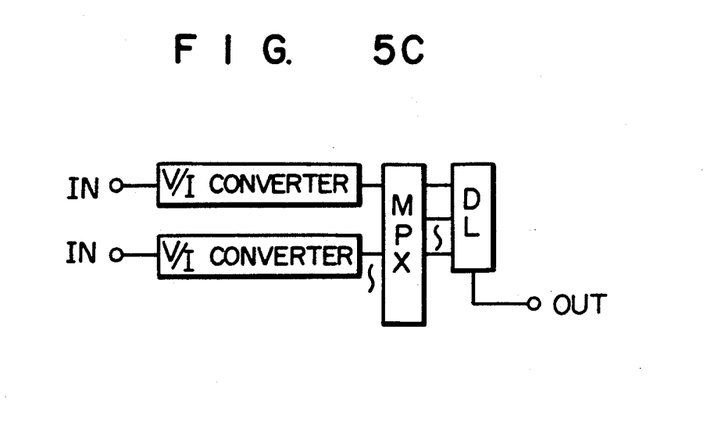

Examples of the configuration of the beam former portion 2 are shown in FIGS. 5A through 5C.

In the configuration of FIG. 5A, a pair of a sampling delay element SC and a switch 30-1 or pairs of sampling delay elements SC and switches 30-1 are provided for every input terminal. As the sampling delay element SC, a switched capacitor, a CCD, a combination of an A/D converter and a line memory, or the like, may be used.

In the configuration of FIG. 5B, a combination of a delay line DL and a multiplexer MPX are provided so that the output taps of the delay line DL are properly selected by the multiplexer MPX so that desired delay is given to the output.

Figure 6A:
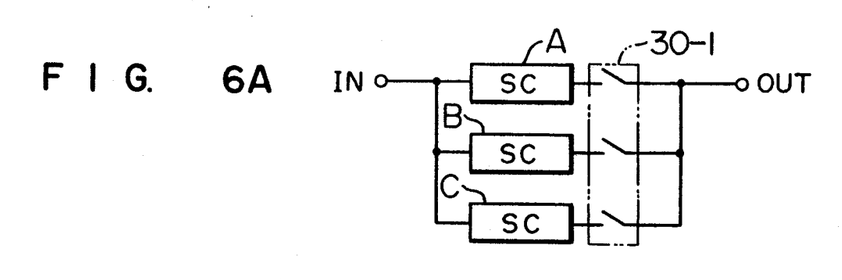
FIG. 6A is a diagram showing an embodiment of the parallel timing.
Figure 6B:
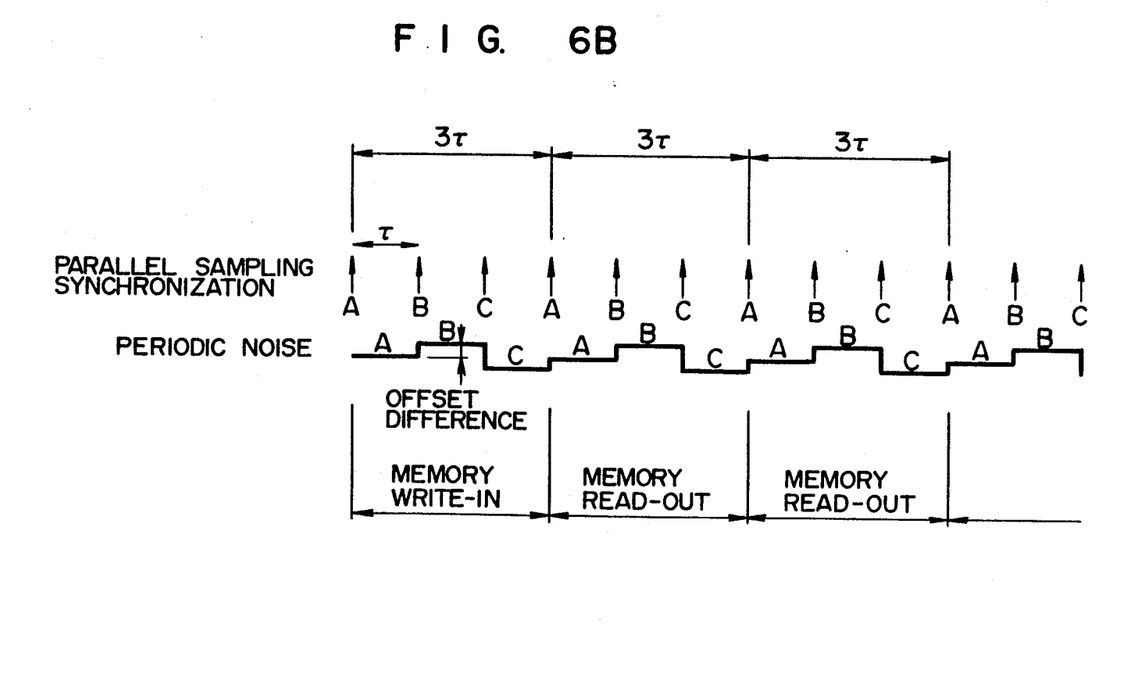
FIG. 6B is a diagram for explaining generation of periodic noise.

In the configuration of FIG. 5C, voltage signals from a plurality of input terminals are converted into current signals by corresponding voltage/current converters respectively and the output taps of the delay line DL are properly selected by a multiplexer MPX so that desired delay is given to the output. In the case of the configuration of FIG. 5A, the sampling timings of the respective sampling delay elements SC are shifted from one another and all the outputs are combined so that the sampling frequency of the same input signal is made high. In this case, however, periodic noise is caused by the offset difference of the respective sampling delay elements. By way of example, a case where three sampling delay elements A, B and C are provided is shown in FIG. 6A and a state of generation of periodic noise is shown in FIG. 6B. Although the sampling period of each of the sampling delay elements is 3, the output sampling period is & as a whole because the three sampling delay elements are caused to operate with shift in period by &. Accordingly, the noise which is generated by the offset difference of each sampling delay element appears at a period of 3t.

In a practical case, periodic noise and switching noise appear at the output of the adder 3 in the condition that the periodic noise and switching noise are superimposed on the reception signal, because delay switching operations for dynamic focusing ar performed in parallel. The method of noise elimination in this case is basically the same as that of the case of noise elimination of FIG. 4. That is, the noise elimination is performed through following steps of:

(a) actuating parallel-connected sampling delay elements (A, B, C) and delay switches (30-1) for dynamic focusing to operate in a section (A) in which no ultrasonic wave transmission/reception is performed, the delay means being operated in respective sampling timings shifted from one another;

(b) adding the respective outputs of the delay switches to each other by means of an adder 3;

(c) storing a switching noise signal and a periodic noise signal into a noise write/read device 4, the switching noise signal being generated from the delay switches, the periodic noise signal being generated as offset of the delay elements, the switching noise signal and the periodic noise signal appearing at the output of the adder;

(d) transmitting an ultrasonic wave by means of an array of transducers 11 so as to receive an echo signal of the transmitted ultrasonic wave and for switching the delay switches so as to obtain a desired reception wave beam;

(e) adding the respective outputs of the delay switches to each other by means of the adder;

(f) reading the stored noise signals out of the noise write/read device;

(g) obtaining a difference between the output signal of the adder and the read-out noise signals by a differential amplifier 6 to thereby eliminate noise signal; and (h) processing the signal from which noise has been eliminated by means of a TGC circuit or a compression and detection circuit.

The noise signal may be amplified by an amplifier 8 when it is written into the noise write/read device 4, and the noise signal may be attenuated by an attenuator 9 when it is read out from the noise write/read device 4.

Figure 7A:
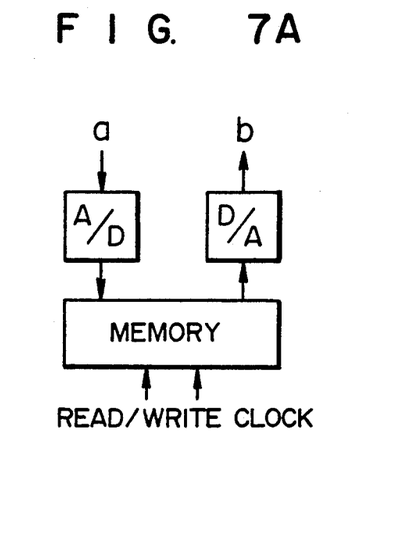
FIGS. 7A, 7B and 7C are diagrams showing the embodiments of the noise write/read device.
Figure 7B:
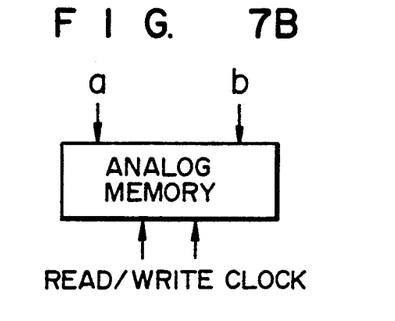
Figure 7C:
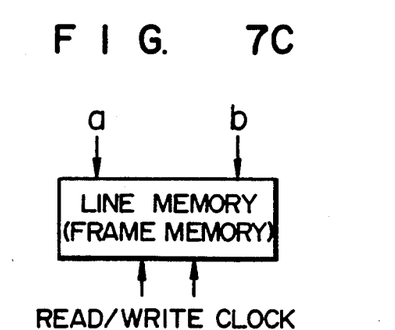

FIGS. 7A through 7C show specific examples of the configuration of the above-mentioned noise write/read device 4. In the drawings, the characters a and b designate the above-mentioned signals. FIG. 7A shows an embodiment of the noise write/read device 4 which is constituted by an A/D converter, a memory, and a D/A converter. FIG. 7B shows another embodiment of the noise write/read device 4 which is constituted by an analog memory such as a switched capacitor. FIG. 7C shows a further embodiment of the noise write/read device 4 which is constituted by a line memory or a frame memory in the case where the delay network 2 shown in FIG. 2 is constituted by, for example, an A/D converter so that delay network is performed with a digital signal.

Although the case where the writing of noise into the noise write/read device 4 is carried out in every frame synchronization (X) has been described in the above explanation about FIGS. 3 and 4, the above writing of noise into the noise write/read device 4 may be carried out for every plural frame synchronizations or only once at the time of probe mode setting, not every frame synchronization, in the case where the temporal fluctuations due to temperature changes or power source fluctuations of the noise generated by the delay elements and switches are small.

Although the above embodiments have been described as to the case where the switching device 12 is used in order to perform linear or convex electronic scanning, the switching device 12 is not necessary in the case where sector electronic scanning is performed.

Although the above embodiments have been described as to the case where the noise write/read device 4 and the differential amplifier 6 are disposed in the stage after the adder 3 and before the TGC circuit and the compression and detection circuit, the noise write/read device 4 and the differential amplifier 6 ma be disposed in the stage before the adder 3. In this case, however, provision of a plurality of pairs of noise write/read devices 4 and differential amplifiers 6 is required. Alternatively, the noise write/read device 4 and the differential amplifier 6 may be disposed in the stage after the TGC circuit. In this case, however, noise amplification so increases that the number of bits of the memory increases. In the case where the noise write/read device 4 and the differential amplifier 6 are disposed in the stage after the compression and detection circuit, it becomes necessary to provide means for eliminating a non-linear differential component in order to maintain the linearity of the signal.

We claim:

1. A beam forming method in an ultrasonic imaging system, said method comprising the steps of:
   (a) actuating delay switches for dynamic focusing to operate in a section in which no ultrasonic wave transmission/reception is performed;
   (b) adding the respective outputs of said delay switches to each other by means of an adder;
   (c) storing a switching noise signal into a memory means, said switching noise signal being generated from said delay switches and appearing at the output of said adder;
   (d) transmitting an ultrasonic wave by means of an array of transducers so as to receive an echo signal of said transmitted ultrasonic wave and for switching said delay switches so as to obtain a reception wave beam;
   (e) adding the respective outputs of said delay switches to each other by means of said adder;
   (f) reading said stored noise signal out of said memory means; and
   (g) calculating a difference between the output signal of said adder and the read-out noise signal to thereby obtain a signal which is a reception signal from which said switching noise so far superimposed thereon has been eliminated.

2. A beam forming method according to claim 1, in which said storing step includes the step of storing the output from said adder after said output has been amplified, and in which said reading-out step includes the step of outputting said read-out signal after said read-out signal has been attenuated.

3. A beam forming method according to claim 1, in which said storing step includes the step of storing the output from said adder after said output has been A/D converted, and in which said reading-out step includes the step of reading-out said stored switching noise signal after said stored switching noise has been D/A converted.

4. A beam forming method according to claim 1, in which said storing step includes the step of storing the output from said adder into a switched capacitor acting as an analog memory.

5. A beam forming method in an ultrasonic imaging system, said method comprising the steps of:
   (a) actuating parallel-connected delay means and delay switches for dynamic focusing to operate in a section in which no ultrasonic wave transmission/reception is performed, said delay means being operated in respective sampling timings shifted from one another;

(b) adding the respective outputs of said delay switches to each other by means of an adder;

(c) storing a switching noise signal and a periodic noise signal into a memory means, said switching noise signal being generated from said delay switches, said periodic noise signal being generated as offset of said delay means, said switching noise signal and said periodic noise signal appearing at the output of said adder;

(d) transmitting an ultrasonic wave by means of an array of transducers so as to receive an echo signal of said transmitted ultrasonic wave and for switching said delay switches so as to obtain a reception wave beam;

(e) adding the respective outputs of said delay switches to each other by means of said adder;

(f) reading said stored noise signals out of said memory means; and (g) calculating a difference between the output signal of said adder and the read-out noise signals to thereby obtain a signal which is a reception signal from which said switching noise and said offset periodic noise signal so far superimposed thereon have been eliminated.

6. A beam forming method according to claim 5, in which said storing step includes the step of storing the output from said adder after said output has been amplified, and in which said reading-out step includes the step or outputting said read-out signal after said read-out signal has been attenuated.

7. A beam forming method according to claim 5, in which said storing step includes the step of storing the output from said adder after said output has been A/D converted, and in which said reading-out step includes the step of reading-out said stored switching noise signal after said stored switching noise has been D/A converted.

8. A beam forming method according to claim 5, in which said storing step includes the step of storing the output from said adder into a switched capacitor acting as an analog memory.

9. A beam forming apparatus comprising:
(a) delay means for delaying a received echo wave;
(b) delay switches for switching respective quantities of said delay means;
(c) control means for actuating said delay switches to operate for dynamic focusing in a section in which no ultrasonic wave transmission/reception is performed;
(d) adder means for adding the respective outputs of said delay switches to each other;
(e) memory means (4) for storing a switching noise signal being generated from said delay switches and appearing at the output of said adder means;
(f) read-out means for reading out said stored noise signal from said memory means; and
(g) means for obtaining a difference between the output signal of said adder means and the read-out noise signal to thereby obtain a signal which is a reception signal from which said switching noise so far superimposed thereon has been eliminated.

10. A beam forming apparatus according to claim 9, in which said memory means includes means for amplifying the output from said adder means, and in which said reading-out means includes means for attenuating said read-out signal.

11. A beam forming apparatus according to claim 9, in which said memory means includes means for A/D converting the output from said adder means, and in which said read-out means includes means for D/A converting said stored signal.

12. A beam forming apparatus according to claim 9, in which said memory means includes a switched capacitor acting as an analog memory.

13. A beam forming apparatus comprising
(a) parallel-connected delay means for delaying a received echo wave, said delay means being operated in respective sampling timings shifted from one another;
(b) delay switches for switching respective quantities of said delay means;
(c) control means for actuating said delay means and said delay switches for dynamic focusing to operate in a section in which no ultrasonic wave transmission/reception is performed;
(d) adder means for adding the respective outputs of said delay switches to each other;
(e) memory means for storing a switching noise signal generated from said delay switches and a periodic noise signal generated as offset of said delay means, said switching noise signal and said periodic noise signal appearing at the output of said adder;
(f) read-out means for reading out said stored from said memory means; and
(g) means for obtaining a difference between the output signal of said adder means and the read-out noise signals to thereby obtain a signal which is a reception signal from which said switching noise and said periodic noise signal so far superimposed thereon have been eliminated.

14. A beam forming apparatus according to claim 13, in which said memory means includes means for amplifying the output from said adder means, and in which said reading-out means includes means for attenuating said read-out signal.

15. A beam forming apparatus according to claim 13, in which said memory means includes means for A/D converting the output from said adder means, and in which said readout means includes means for D/A converting said stored signal.

16. A beam forming apparatus according to claim 13, in which said memory means includes a switched capacitor acting as an analog memory.

17. A beam forming method for forming a reception signal of echo waves from a plurality of signals generated in an array of transducers using a multi-channel delay means which includes delay switches for changing delay quantities of respective channels of said multi-channel delay means, said method comprising the steps of:

(a) actuating said delay switches to operate in accordance with a switching sequence for dynamic forming within a period during which no ultrasonic wave transmission/reception is performed;

(b) adding the respective outputs of respective channels of said delay means to each other by means of an adder;

(c) storing a switching noise signal into a memory means, said storing noise signal being generated from said delay switches and appearing at the output of said adder;

(d) transmitting an ultrasonic wave by means of said array of transducers so as to receive echo waves of said transmitted ultrasonic wave and for switching said delay switches in accordance with said switching sequence so as to obtain a reception wave beam;

(e) adding the respective outputs of said multi-channel delay means to each other by means of said adder;

(f) reading said stored noise signal out of said memory means; and (g) calculating a difference between the output signal of said adder and the read-out noise signal to thereby obtain a signal which is a reception signal from which said switching noise so far superimposed thereon has been eliminated.

18. A beam forming method according to claim 17, in which said storing step includes the step of storing the output from said adder after said output has been amplified, and in which said reading-out step includes the step of outputting said read-out signal after said read-out signal has been attenuated.

19. A beam forming method according to claim 17, in which said storing step includes the step of storing the output from said adder after said output has been A/D converted, and in which said reading-out step includes the step of reading-out said stored switching noise signal after said stored switching noise has been D/A converted.

20. A beam forming method according to claim 17, in which said storing step includes the step of storing the output from said adder into a switched capacitor acting as an analog memory.

21. A beam forming method for forming a reception signal of echo waves from a plurality of signals generated in an arrayed transducer using a multi-channel delay means, each channel of said delay means including parallel-connected sampling delay elements for sampling of said signals at sampling timings shifted from one another and output switches sequentially connecting sampled signals to an output terminal of said channel, said method comprising the steps of:

(a) actuating said sampling delay elements and output switches of respective channels of said delay means to operate within a period during which no ultrasonic wave transmission/reception is performed;

(b) adding the respective outputs of respective channels said delay means to each other by means of an adder;

(c) storing a switching noise signal and a periodic noise signal into a memory means, said switching noise signal being generated from said output switches, said periodic noise signal being generated as an offset of said sampling delay elements, said switching noise signal and said periodic noise signal appearing at the output of said adder;

(d) transmitting an ultrasonic wave by means of said array of transducers so as to receive echo waves of said transmitted ultrasonic wave and actuating said sampling delay elements and said output switches of respective channels of said delay means so as to obtain a reception wave beam;

(e) adding the respective outputs of said delay switches to each other by means of said adder;

(f) reading said stored noise signals out of said memory means; and (g) calculating a difference between the output signal of said adder and the read-out noise signals to thereby obtain a signal which is a reception signal from which said switching noise and said offset periodic noise signal so far superimposed thereon have been eliminated.

22. A beam forming method according to claim 21, in which said storing step includes the step of storing the output from said adder after said output has been amplified, and in which said reading-out step includes the step or outputting said read-out signal after said read-out signal has been attenuated.

23. A beam forming method according to claim 21, in which said storing step includes the step of storing the output from said adder after said output has been A/D converted, and in which said reading-out step includes the step of reading-out said stored switching noise signal after said stored switching noise has been A/D/ converted.

24. A beam forming method according to claim 21, in which said storing step includes the step of storing the output from said adder into a switched capacitor acting as an analog memory.

25. A beam forming apparatus for forming a reception signal of echo waves from a plurality of signals generated in an array of transducers, said apparatus comprising:

(a) multi-channel delay means for delaying said signals generated in said arrayed transducers;

(b) delay switches for switching respective quantities of respective channels of said multi-channel delay means;

(c) control means for actuating said delay switches to repeatedly operate in accordance with a switching sequence for dynamic focusing within a first period during which no ultrasonic wave transmission/reception is performed and within a second period during which echo waves due to transmission of a ultrasonic wave are received by said array of transducers;

(d) adder means for adding the respective outputs of said multi-channel delay means to each other;

(e) memory means for storing a switching noise signal being generated from said delay switches and appearing at the output of said adder means within said first period;

(f) read-out means for reading out said stored noise signal from said memory means; and (g) means for obtaining a difference between the output signal of said adder means within said second period and the read-out noise signal to thereby obtain a signal which is a reception signal from which said switching noise so far superimposed thereon has been eliminated.

26. A beam forming apparatus according to claim 25, in which said memory means includes means for amplifying the output from said adder means, and in which said reading-out means includes means for attenuating said read-out signal.

27. A beam forming apparatus according to claim 25, in which said memory means includes means for A/D converting the output from said adder means, and in which said read-out means includes means for D/A converting said stored signal.

28. A beam forming apparatus according to claim 25, in which said memory means includes a switched capacitor acting as an analog memory.

* * * * *